March 2, 1948.  T. O. SUMMERS, JR  2,437,175
GYROSCOPIC FLIGHT INDICATING INSTRUMENT
Filed Dec. 8, 1942   3 Sheets-Sheet 1

INVENTOR.
THOMAS O. SUMMERS JR.
BY Stuart M. Maule
ATTORNEY.

March 2, 1948. T. O. SUMMERS, JR  2,437,175
GYROSCOPIC FLIGHT INDICATING INSTRUMENT
Filed Dec. 8, 1942   3 Sheets-Sheet 2
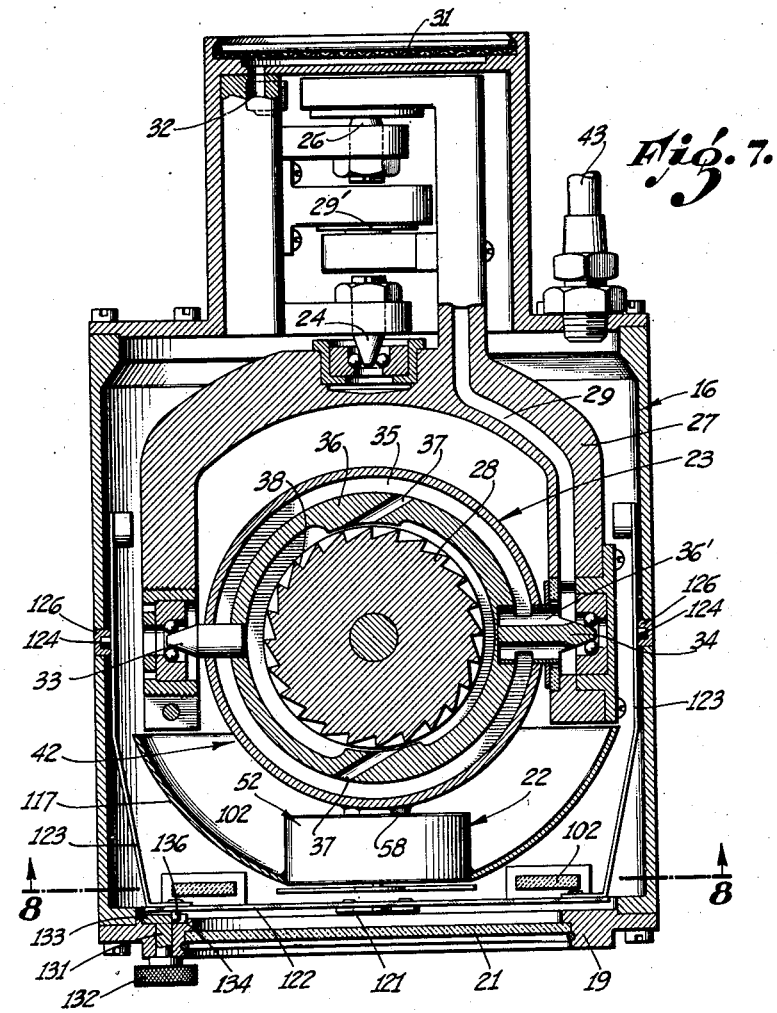
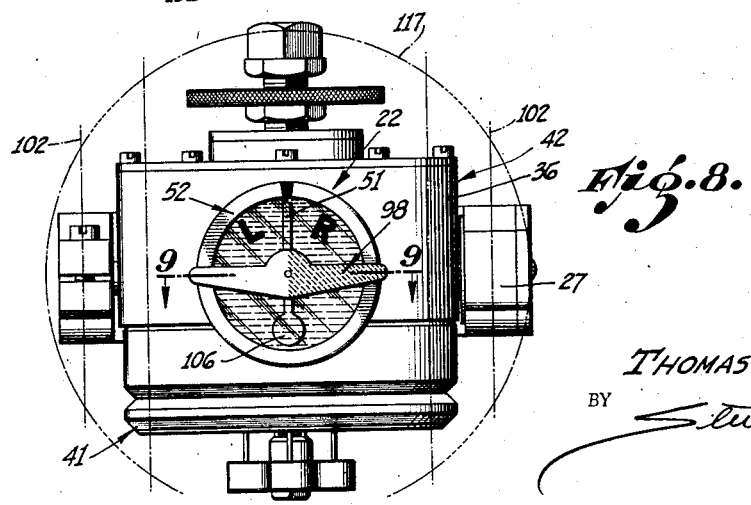
INVENTOR.
THOMAS O. SUMMERS JR.
BY Stuart M. Maule
ATTORNEY.

March 2, 1948.    T. O. SUMMERS, JR    2,437,175
GYROSCOPIC FLIGHT INDICATING INSTRUMENT
Filed Dec. 8, 1942    3 Sheets-Sheet 3

INVENTOR.
THOMAS O. SUMMERS JR.
BY
ATTORNEY.

Patented Mar. 2, 1948

2,437,175

UNITED STATES PATENT OFFICE 2,437,175

GYROSCOPIC FLIGHT INDICATING INSTRUMENT

Thomas O. Summers, Jr., Los Angeles, Calif.

Application December 8, 1942, Serial No. 468,189

7 Claims. (Cl. 33—204)

This invention relates to gyroscopic indicators and more particularly to aircraft instruments for determining spacial orientation.

An object of my present invention is to provide a flight indicating instrument which includes means actuated by centrifugal force for indicating severity of turn, and which represents an improvement over instruments of this nature already in common use in that it is not affected by yawing of the craft carrying the instrument.

Another object is to provide an instrument for indicating severity of turn as described, and a bank indicator so cooperatively associated therewith as to be capable of giving the pilot an immediate indication not only of the degree at which his ship is banking, but also, in the event that the degree of bank is not that which will enable the ship to negotiate the turn then being made, in just what manner and to what extent the banking of the craft should be corrected.

A further object is to provide a flight indicating instrument capable of indicating turn, degree of bank actually being experienced, degree of bank appropriate to a turn being negotiated, and attitude of the ship about a transverse axis, and wherein the indicating media by the observation of which the pilot can inform himself regarding all four of these functions are arranged in a single, easily read group, in contradistinction to more conventional practice which has necessitated the observation of several independently operating instruments disposed at relatively widely spaced positions upon the instrument panel in such a manner as to preclude their simultaneous observation and comparison by the pilot.

A further object in this connection is so to design and correlate the mechanism for performing these several functions that it is of unitary construction and capable of being mounted in a single housing of substantially the same size and shape as that conventionally employed for a single gyroscopic instrument such as an artificial horizon, and thereby not only reduce the number of separate instruments which must be checked constantly by the pilot, but also effect a valuable saving in weight and space on the instrument panel.

Another object is to present an instrument of the character described wherein the bank-indicating reference is damped in such a manner as to prevent its uncontrolled and sudden movements.

The invention possesses other objects and features of advantage, some of which, with the foregoing, will be set forth in the following description of the preferred forms of my invention illustrated in the drawings accompanying and forming part of the specification. It is to be understood however, that I do not limit myself to the showing made by the said drawings and description as I may adopt variations of the preferred forms within the scope of my invention as set forth in the claims.

Referring to the drawings.

Figure 1:
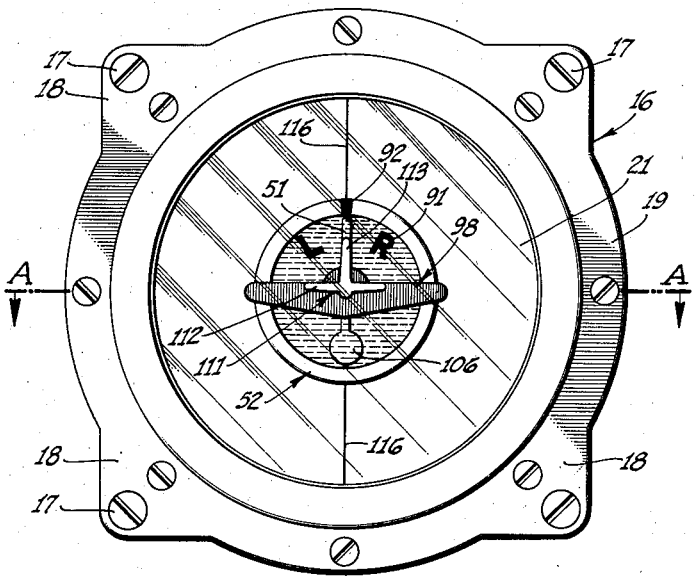
Figure 1 is face view of a flight-indicating instrument embodying the principles of the present invention with the several indicating media thereof in their respective positions to indicate straight and level flight.

Figure 7 is a horizontal, medial sectional view, the plane of section being indicated by the line A—A of Figure 1 and the direction of view by the arrows. In Figs. 1 through 6, the airplane tail simulating indicia is fixedly mounted on the instrument housing. In Fig. 7, this indicia is adjustably mounted in the instrument housing.

Figure 8 is a transverse, vertical sectional view taken just behind the transparent face of the instrument, the plane of section being indicated by the line 8—8 of Figure 7 and the direction of view by the arrows.

Figure 9:
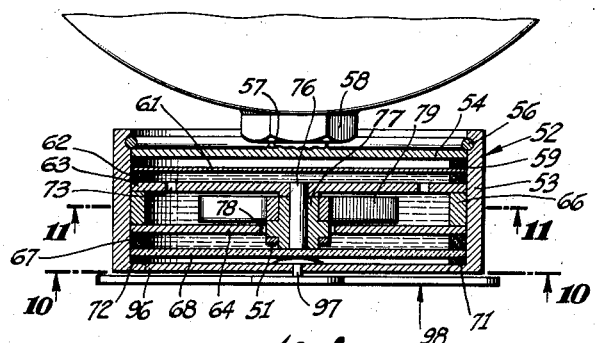

Figure 9 is an enlarged detail view in horizontal section taken upon the line 9—9 of Figure 8 with the direction of view as indicated, to show the construction of the pendulum indicator and damping mechanism associated therewith.

Figure 10:
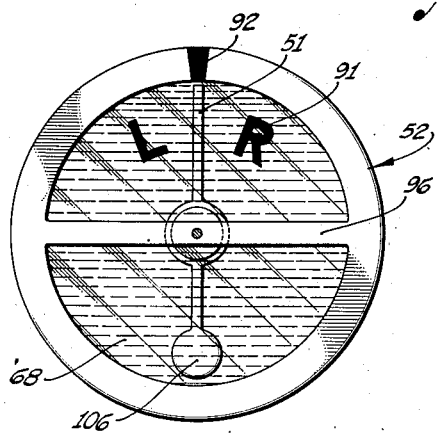

Figure 10 is a transverse, vertical sectional view taken upon the line 10—10 of Figure 9 with the direction of view as indicated.

Figure 11:
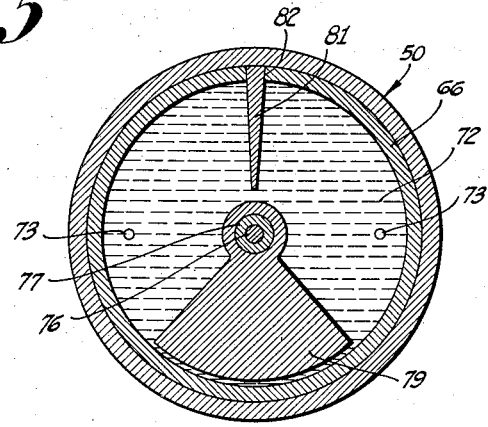

Figure 11 is a view similar to Figure 10 taken, however, on the line 11—11 with the direction of view as indicated.

Figure 12:
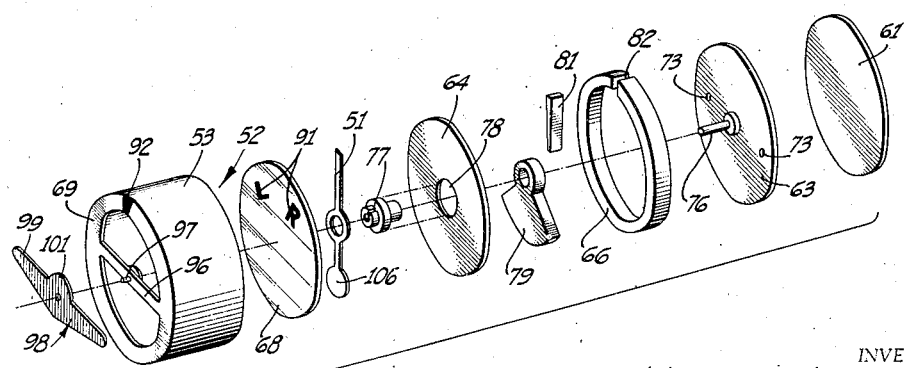

Figure 12 is an exploded view in perspective showing the relative arrangement of parts which comprise the pendulum indicator and its damping mechanism.

That modification of the flight indicating instrument of the present invention which has been chosen for illustration and description herein is shown as being encased in a suitable housing 16 adapted for mounting upon the instrument panel of an airplane, as by mounting screws 17 extending through lugs 18 which are provided upon front 19 of the housing. The front 19 also is provided with a transparent window 21 through which may be observed the indicating media, indicated in their entirety at 22.

The mechanism for operating the indicating media 22 comprises a gyroscope 23 supported for universal movement by means of a gimbal 27 mounted in bearings 24 and 26. In order to leave the indicating media 22 unobstructed and thus permit their facile observation through window 21, I prefer to mount the gimbal 27 in such a manner as to leave the end of the operating structure which is proximal to the window 21 entirely free and clear and therefore the preferred construction employs a gimbal mounting wherein the two spaced bearings which carry the gimbal 27 are both disposed at the opposite end of the instrument. For a more complete disclosure of this type of gimbal support reference may be had to my co-pending application, Serial No. 457,730, filed September 9, 1942, now Patent No. 2,423,269, issued July 1, 1947. Suffice it, therefore, for the purpose of the present disclosure to explain that air is supplied to the gyroscope 23 to effect rotation of its rotor 28 by means of a passageway 29 in the gimbal 27 and leading from a packed joint 29' arranged co-axially with respect to the bearings 24 and 26, as also explained in greater detail in my said co-pending application. Atmospheric air is supplied to the joint 29' through a screened entrance opening 31 and an associated passageway 32 leading therefrom through the bracket which supports the bearings 24 and 26 and to the joint 29'. The gyroscope 23 is supported in the gimbal 27 through the expedient of a pair of axially aligned pins 33 and 34 which are revolubly supported by bearings in gimbal 27. One of these pins, say the pin 34, is of hollow construction as indicated at 36' to establish communication between the passageway 29 in the gimbal 27 and another passageway 35 in the rotor-bearing casing 36 of the gyroscope 23 whereby the air is supplied to the orifices 37 which direct their jets tangentially against buckets 38 arranged on the periphery of the rotor 28 of the gyroscope 23, and thereby effect spinning of the rotor 28.

The parts are so proportioned and arranged that the entire structure supported by the gimbal 27 is in substantially neutral equilibrium; and for the purpose of maintaining this structure with the axis of spin of the rotor 28 in pre-selected position, a suitable erecting mechanism 41 is cooperatively associated with the gyroscope 23, thereby presenting a gyro vertical construction 42. Although any suitable type of erecting mechanism may be employed, for the sake of accuracy and dependability of operation and convenience of installation, I prefer to use one of the type disclosed in my co-opending abandoned application, Serial No. 463,050, filed October 23, 1942. However, since the details of its construction and operation of the erecting mechanism form no portion of the present invention, the following brief discussion thereof will suffice for the purpose of the present disclosure:

Operation of the erecting mechanism to cause it to perform the function of maintaining the gyroscope in pre-selected position is attained by means of a plurality of ports (not shown) so arranged that they direct jets of air in such directions that the reactive forces of those jets act upon the housing of the gyroscope to exert erecting torque thereagainst and thus cause the gyroscope to precess; and the ports are separately regulated in such a manner that each becomes operative whenever the gyroscope deviates from verticality in such direction that the reactive force of its jet is in the proper direction to correct the deviation. It is convenient, therefore, to operate the erecting mechanism 41 by the same air as that which drives the rotor, particularly so since the erecting mechanism is mounted directly upon the bottom of the rotor-bearing casing 36, so that as the air escapes the casing it passes directly into the erecting device where it is passed to the torque-developing ports. This double purpose flow of air through the gyro vertical 42 is induced by so arranging the torque-developing ports that they discharge from the housing of the erecting mechanism into the interior of the main housing 16, where a partial vacuum is maintained by means of an exhaust tube 43.

The indicating media 22 include a pendulum indicator 51 which is carried by the rotor-bearing casing 36 within a suitable chamber 52 which is rigid with the rotor bearing casing 36 and therefore is stabilized by the gyro vertical 42 against moving with the airplane when the latter experiences pitching or rolling. The pendulum indicator 51 is mounted for swinging movement about an axis which coincides with the major gimbal axis, i. e., about the axis of the bearings 24, 26. Referring to Figs. 9 through 12, the chamber 52 is conveniently formed of a substantially cylindrical housing 53 the back wall 54 of which is removably secured in position as by a snap ring 56 (see Fig. 9). The back wall 54 has a stud 57 formed centrally thereon threaded into the forward side of the rotor bearing casing 36, a lock nut 58 being provided to anchor the parts in selected position. Forward of the back wall 54 and spaced slightly therefrom by a resilient sealing gasket 59 is a thin and consequently relatively flexible closing partition 61; and forward of this partition 61 and similarly spaced therefrom as by a gasket 62, is a relatively rigid partition 63. A disc 64 is spaced forward of the partition 63 by a relatively wide, annulus 66; and in front of the disc 64 and separated therefrom by another sealing gasket 67 is a disc 68 of glass or other suitable transparent material which is spaced from an inwardly extending flange 69 of the housing 52 by a sealing gasket 71.

The flexible partition 61 and the transparent disc 68 cooperate to confine a suitable liquid 72 within the housing 53. The reason for using a thin member for the partition 61 is that it permits expansion of the fluid 72 in conformity with temperature fluctuations. Toward this same end, the partition 63 is provided with preferably a plurality of apertures 73. A pin 76 is mounted centrally and rigidly upon the partition 63 and extends forward therefrom to provide a journal support for a stub shaft 77 upon the forward end of which the pendulum indicator 51 is rigidly secured. The stub shaft 77 extends through a central aperture 78 in the partition 64 so that whereas the pendulum indicator 51 is disposed in front of the partition 64 the after end of the stub shaft 77 is behind that partition. Hence, a pendulous weight 79 which is rigidly secured to the after end of the stub shaft 78 is concealed from view through the window 68 by the partition 64 which serves therefore as a mask leaving only the pendulum indicator 51 visible. The pendulous weight 79 is substantially sector shaped with a radius only slightly less than the inside radius of the spacing annulus 66, with the result that when the pendulous mass 79 swings about the axis of the pin 76 it urges the fluid 72 to move within the housing 53. Such movement of the fluid however, is resisted by a baffle 81 which conveniently takes the form of a wedge-shaped member extending radially inwards from the spacing annulus 66. For the sake of convenience this spacing annulus 66, instead of being a complete ring, is split to leave an opening 82 at the upper portion thereof within which the baffle 81 is gripped so securely when the annulus 66 is pressed into the housing 53, that retention of the baffle 81 in desired position is assured.

Thus it may be seen that although the pendulum indicator 51 of itself is not necessarily pendulous, the pendulous mass 79 which is rigidly connected thereto by means of the stub shaft 77 causes the pendulum indicator 51 to move in exactly the same manner as though the indicator 51 itself were pendulous. However, such movements of the indicator 51 and the mass 79 are damped because of the fact that the mass 79 is immersed in the fluid 72, and because of the further fact that the movement of the fluid 72 within the housing 73 is restricted by the baffle 81. The indicator 51 is so positioned upon the stub shaft 77 that it extends vertically when the mass 79 hangs with its center of gravity directly below the axis of the pin 76. Consequently the assembly of indicator 51, shaft 77 and mass 79 are sensitive to acceleratory forces exerted in a transverse direction, such as those caused by centrifugal action when the airplane on which the instrument is mounted negotiates a turn.

At least two purposes are accomplished by damping of movements of the mass 79 and its indicator 51. One of these purposes is that of making the indicator 51 more nearly "dead beat," i. e., minimizing the tendency for the indicator to hunt its proper indicating position as by gradually settling thereon by moving back and forth therepast with oscillations of gradually decreasing amplitude. The other purpose accomplished by damping is to minimize the tendency for indicator 51 to move from its vertical, zero reading position by transverse forces of such short duration that they are of no particular significance as far as navigation of the plane is concerned.

Figure 4:
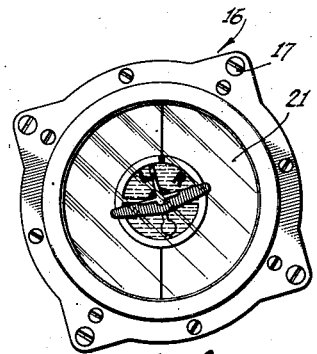
Figure 4 is another similar view indicating a properly banked left turn.
Figure 6:
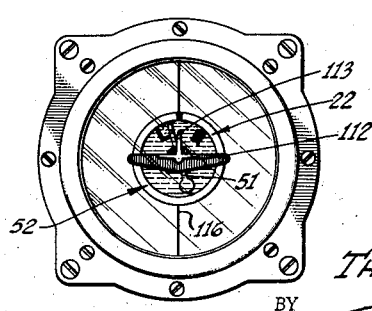
Figure 6 is still another similar view wherein the indicating media show that the ship is turning to the left without, however, being properly banked.

For example, the described damping of the mass 79 will prevent the indicator 51 from moving to any material extent as the result of yawing of the craft, thus enabling the pilot to rely upon the pendulum indicator 51 to indicate only those movements of the plane which actually are coincident with its deviation from straight line travel. That is to say, when the airplane on which the instrument is mounted actually negotiates a turn, the pendulous mass 79 will be thrown toward the outside of that turn by centrifugal force, thus causing the stub shaft 77 to turn, carrying with it the pendulum indicator 51 which thus will be caused to assume an oblique position, as shown in Figures 4 and 6. Moreover, the extent of movement of the mass 79 and its pendulum indicator 51 is a function of the rate at which the turn is negotiated, with the result that the pendulum indicator 51 not only indicates whether or not the ship is turning, but it also gives a reliable reading in terms of severity of turn.

In order to facilitate the pilot's observation of the instrument to ascertain direction and severity of turn I prefer to provide indicia 91 on the transparent front 68 of the casing 52, and whereas these indicia may take the form of calibrations to aid in the reading of the actual severity of turn, the preferred construction employs only the initials "L" "R." It is believed that under most circumstances of aerial navigation the severity of turn can be ascertained with sufficient accuracy merely by observation of the approximate angularity of the pendulum indicator with respect to the vertical without having to bother about making comparison of positions of the needle with a series of calibrations. The pilot's ready observation of the position of the pendulum indicator 51 to ascertain whether it is in its zero-reading position or displaced therefrom, and if displaced, to what extent, is facilitated by providing a reference mark in association with the pendulum indicator 51. This reference mark may conveniently take the form of a single mark 92 on the front of the housing 53, preferably of such shape and so arranged that it appears to be a continuation of the upper end of the pendulum indicator 51 when that indicator is in its zero-reading position. As a result, even the slightest deviation of the indicator 51 from its zero-reading position is immediately apparent because of the ensuing misalignment of both side edges of the pendulum indicator with the corresponding side edges of the mark 92.

Figure 5:
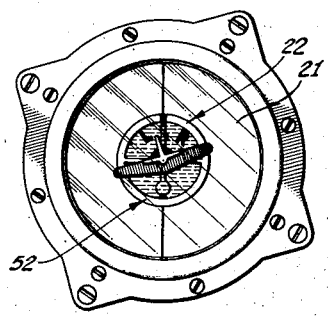
Figure 5 is another similar view showing an improperly banked condition, i. e., the ship is tilted to the left but is not experiencing a turn and therefore is experiencing or is apt to develop a side slip.

The instrument also includes a gyroscopically stabilized reference, the function of which is to give the pilot a ready indication of whether his ship is experiencing any lateral inclination. The cylindrical shell 53 of the chamber 52 is providel with a diametrically extending rib 96 disposed in front of the transparent window 68. This rib 96 provides a journal support for a pin 97 upon the forward end of which a reference, or indicator 98 is secured. Preferably this indicator 98 is shaped to provide a miniature wing and fuselage portion 101 so that it simulates the appearance of the forward portion of an airplane viewed from directly astern. Whereas the indicator 98 is free to rotate about the axis of the pin 97, means are provided for retaining the indicator 98 with the wings 99 of the indicator parallel to the wings of the actual airplane. The indicator 98 is formed of suitable magnetic material; and mounted rigidly within the main housing 16 are preferably a pair of magnets 102 (Fig. 1). These magnets are arranged on opposite sides of chamber 52 and with their longest dimensions extending vertically; and since it is desirable in the present construction that they be magnetized transversely it is preferred that magnets composed of aluminum, cobalt and nickel be employed, since the use of this combination of metals in the manufacture of a magnet facilitates such a transverse magnetization. Actually, therefore, the indicator 98 is an armature retained in pre-selected position with respect to the airplane by its controlling magnets 102 with the result that regardless of the position of transverse inclination assumed by the airplane, the indicator 98 will be held by the magnets 102 to corresponding position. By comparison of indicator 98 and line 116 there is conveyed instantly to the pilot a reliable indication of whether or not the ship is laterally inclined and if so, to what extent. Figures 4 and 5 show the indicator 98 in a position wherein it shows that the airplane is laterally inclined whereas Figures 1, 2, 3, and 6 show the device indicating that the ship is disposed with its wings horizontal.

An important feature of this portion of my invention lies in the fact that the wing-simulating indicator 98 and the pendulum indicator 51 both move about a common axis and are in superimposed relationship, since this arrangement thereof makes them appear to the pilot that they intersect each other. This detail makes possible the instant comparison of the respective positions of these two indicators and the amply accurate estimation of the angularity therebetween. As a consequence, the pilot can instantly be apprised of whether or not his ship is being banked at the angularity appropriate to the turn then being negotiated. Even though the pilot were to glance at the instrument in the utmost haste and with his mind preoccupied with other matters, the lack of perpendicularity between the two indicators 51 and 98 would instantly be so obvious to the pilot that it would operate as a warning signal, informing him that an error is being committed in the manner in which the ship is being flown, and that some correction is required. The nature and extent of the necessary correction also are shown by the instrument and are impressed upon the pilot's consciousness with almost equal speed. Since the lower end 106 of the indicator 51 is enlarged to present the appearance of a round weight such as that with which the most familiar type of pendulum ordinarily is provided, the indicator actually looks like a pendulum; and since the movements of the indicator 51 correspond to those which a real pendulum would make under similar circumstances, the pilot is made to realize the actual conditions of flight which are responsible for the indicator 51 having taken a certain position, with a minimum of mental effort.

For example, Figure 6 shows the effect upon the instrument of the ship having been put into a turn without being correspondingly banked. The oblique position of the pendulum indicator 51 shows that the ship is turning, and since what appears to be its weighted lower end is thrown to the right the pilot is enabled to realize instantly that the ship is turning to the left. Furthermore it is equally apparent that the ship should be banked by raising the starboard wing tip, until perpendicularity is reestablished between the indicators 51 and 98, in order to place the ship in the properly banked position as determined by the severity of the turn which the ship is experiencing and which accounts for the oblique position of the pendulum indicator 51.

In Figure 5, on the other hand, the pendulum indicator 51 is disposed vertically, showing that the ship is traveling straight ahead, while the wing-simulating indicator 98 is tilted with its port side lowered, thus showing that the ship is correspondingly tilted. Instantly upon glancing at the instrument, and without having to read any calibrations or otherwise to exert any conscious effort, the pilot is made to realize that the port wing tip should be raised if he is to avoid side slip which might prove to be dangerous.

Figure 4 illustrates the condition of the instrument while the ship is in a properly banked turn. That both the direction and the degree of banking are appropriate, respectively, to the direction and rate of turn is instantly apparent because of the fact that the condition of perpendicularity between the two indicators 51 and 98 is so readily apparent.

Means also are provided in the flight indicator of the present invention for indicating pitch, i. e., whether or not the ship is in level flight, or if it is either climbing or descending. Since the wing-simulating indicator 98 is carried by structure which is rigid with the rotor-bearing casing 36, and since this structure is a part of that which is stabilized by the gyro vertical 42, the housing 16 of the instrument will move in rotary motion about the minor gimbal axis with respect to the stabilized portion of the instrument when the ship carrying the instrument experiences any pitching maneuver. However, since the entire housing 53 of the chamber 52 on which the wing-simulating indicator 98 is mounted also is stabilized, it is necessary, in order for the pilot to determine pitch, for him to observe the position of the indicator 98 with respect to the center of the window 21 through which the indicating media 22 are observed. Accordingly, a second zero-indicating reference mark 111 is provided, this mark 111 being carried by the housing 16 with the result that it moves vertically with respect to the wing-simulating indicator 98 when pitch occurs. The preferable form for this mark 111 is that of a miniature simulation of the tail structure of an airplane, its size being proportionate to that of the wing-simulating indicator 98 so that the two indicators 98 and 111 cooperate with each other in presenting a rather close simulation of the appearance of a complete airplane viewed from directly astern.

Figure 2:
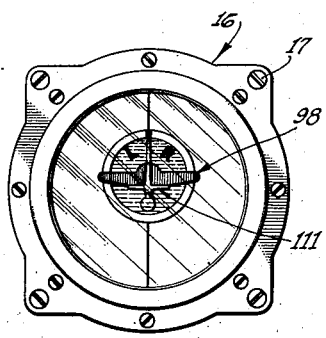
Figure 2 is a view similar to Figure 1, drawn to a reduced scale but with the indicating media showing "tail low" position.
Figure 3:
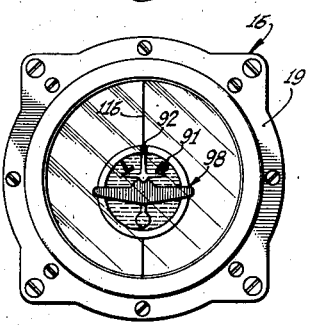
Figure 3 is a similar view showing "tail high" position.

Consequently the roll and pitch indicating media of the present instrument correspond closely both in appearance and mode of operation to the corresponding indicators of the gyroscopic instrument which forms the subject matter of my co-pending application, Serial Number 457,730, now Patent No. 2,423,269. Since the wing-simulating indicator 98 is stabilized by the gyroscope 23 against pitching any pitching movement of the ship will cause the reference mark 111 to move vertically with respect to the wing-simulating indicator 98 so that when the ship noses up the wing-simulating indicator 98 will be higher than the reference mark 111 as illustrated in Figure 2 with the result that the two indicators together closely resemble an actual picture of the ship taken from astern and projected on the instrument panel for the pilot's ready observation and showing the forward portion of the miniature replica of the plane actually higher than the tail portion thereof. Similarly with respect to Figure 3 wherein the forward or wing-simulating portion 98 is lower than the mark 111 or tail-simulating portion, a position which will be assumed when the ship is in a nose down attitude. The mark 111 includes a transversely extending portion 112 corresponding to the horizontal rudder of a plane and a portion 113 extending vertically upwards from the center thereof corresponding to the vertical rudder. Since the vertical portion 113 overlies the pendulum indicator 51 and since it is at all times perpendicular to the wing-simulating indicator 98, it further facilitates observation of any deviation from true perpendicularity between the pendulum indicator 51 and the wing-simulating indicator 98, for the purpose of determining whether or not the ship is banking appropriately to the severity of turn being negotiated, as explained hereinabove.

However, the vertical portion 113 also affords great convenience when observed without making any comparison thereof with the pendulum indicator. Any deviation of this portion 113 from truly vertical position is very readily discernable even though such deviation may be slight, regardless of the position of the pendulum indicator 51, this follows from the fact that the reference mark 92 is maintained by the gyro vertical 42 in position vertically above the axis about which the indicator 111 rotates in accordance with lateral inclination of the ship. Accordingly when the vertical portion 113 of the indicator 111 does not point accurately at the reference mark 92, for example, as illustrated in Figures 4 and 5 lateral tilting of the ship is indicated.

Whereas in Figures 1 to 6, inclusive, the tail-simulating reference mark 112 is carried by the transparent window 21 and hence is rigid with respect to the main housing 16 of the instrument, Figure 7 illustrates a modified form of support for the tail-simulating indicator wherein it is vertically adjustable. Under certain conditions of flight circumstances may arise which might make it desirable to shift the indicator 121 vertically so that its zero-reading position is other than at the exact center of the window 21. For example, the ship might be so loaded that it is somewhat out of "trim," i. e., it is either nose-heavy or tail-heavy and consequently must fly in a different position with respect to the horizontal in order to maintain level flight. Having the tail-simulating indicator 121 vertically adjustable permits the pilot to compensate for such unusual loading conditions by placing the indicator 121 in that position in which it is aligned with the wing-simulating indicator 98 when the ship is in horizontal flight.

Toward this end the indicator 121, instead of being fastened to the transparent window 21, is carried by a transversely extending and preferably transparent bar 122. This bar is mounted for vertical adjustment but instead of being mounted for planar movement it is movable in an arc the center of which lies in the minor gimbal axis of the gyroscope, i. e., in the axis of the pins 33 and 34. Consequently the transparent bar 122 is rigidly secured to and interconnects a pair of arms 123 each of which is pivotally mounted as by a pin 124 revolubly seated in a bushing 126 which is rigid with the main housing 16. These two bushings 126 are oppositely disposed in the sides of the housing 16 and within the plane of movement of the axis of the pins 33 and 34. Hence when the indicator 121 is adjusted vertically it moves in an arcuate path about the same axis as that about which the housing 16 moves with respect to the gyroscopically stabilized mechanism when the ship carrying the instrument pitches. Means are provided for manually shifting the indicator 121. A convenient form of such mechanism is a revoluble stem 131 extending through the front wall of the housing 16 and having a manually rotatable head 132 on its exposed end. The inner end of the stem 131 carries a disc 133 having a notch 134 in one side thereof within which a pin 136 is seated and since this pin 136 is rigid with the transparent bar 122, rotation of the head 132 of the stem 131 results in vertical movement of the indicator 121.

I claim:

1. A flight indicating instrument for aircraft comprising, in combination, an indicator housing for mounting on an aircraft; a gyro-vertical universally mounted in said indicator housing; a cylindrical housing member movable with and stabilized by said gyro-vertical; a pendulum indicator mounted in said housing member for pivotal movement in a transverse plane in response to transverse acceleration forces; and means in said housing member operative to dampen oscillations of said pendulum indicator.

2. A flight indicating instrument for aircraft comprising, in combination, an indicator housing for mounting on an aircraft; a gyro-vertical universally mounted in said indicator housing; a cylindrical housing member movable with and stabilized by said gyro-vertical; a pendulum indicator mounted in said housing member for pivotal movement in a transverse plane in response to transverse acceleration forces; a pair of relatively vertical movable aircraft attitude indicators cooperatively associated with said pendulum indicator, one of said attitude indicators being fixed relative to the aircraft and the other being secured for movement in a vertical plane with said housing member, to simulate pitching of the aircraft.

3. A flight indicating instrument for aircraft comprising, in combination, an indicator housing for mounting on an aircraft; a gyro-vertical universally mounted in said indicator housing; a cylindrical housing member movable with and stabilized by said gyro-vertical; a pendulum indicator mounted in said housing member for pivotal movement in a transverse plane in response to transverse acceleration forces; and a pair of relatively vertically movable aircraft attitude indicators cooperatively associated with said pendulum indicator, one of said attitude indicators being fixed relaitve to the aircraft and the other being secured for movement in a vertical plane with said housing member to simulate pitching of the aircraft; both of said attitude indicators being oscillatable about the longitudinal axis of the aircraft to simulate banking of the latter.

4. A flight indicating instrument for aircraft comprising, in combination, an indicator housing for mounting on an aircraft; a gyro-vertical universally mounted in said indicator housing; a cylindrical housing member movable with and stabilized by said gyro-vertical, the axis of said housing member being parallel to the longitudinal axis of the aircraft; a transparent indicating face member mounted at the forward end of said housing member; an opaque circular partition mounted intermediate the ends of said housing member; an axial shaft pivotally mounted in said housing member and extending through said partition; a pendulous weight secured to said shaft behind said partition for pivotal movement in a transverse plane in response to transverse acceleration forces; a pendulum indicator secured to said shaft between said face member and said partition to indicate such transverse acceleration forces; and means in said housing member operative to dampen oscillations of said pendulous weight.

5. A flight indicating instrument for aircraft comprising, in combination, an indicator housing for mounting on an aircraft; a gyro-vertical universally mounted in said indicator housing; a cylindrical housing member movable with and stabilized by said gyro-vertical, the axis of said housing member being parallel to the longitudinal axis of the aircraft; a transparent indicating face member mounted at the forward end of said housing member; an opaque circular partition mounted intermediate the ends of said housing member; an axial shaft pivotally mounted in said housing member and extending through said partition; a pendulous weight secured to said shaft behind said partition for pivotal movement in a transverse plane in response to transverse acceleration forces; a pendulum indicator secured to said shaft between said face member and said partition to indicate such transverse acceleration forces; means in said housing member operative to dampen oscillations of said pendulous weight; an aircraft attitude indicator pivotally mounted on said housing member in front of said face member for oscillation in a transverse plane; and means movable with said housing and operative to oscillate said attitude indicator to simulate banking of the aircraft.

6. A flight indicating instrument for aircraft comprising, in combination, an indicator housing for mounting on an aircraft; a gyro-vertical universally mounted in said indicator housing; a cylindrical housing member movable with and stabilized by said gyro-vertical, the axis of said housing member being parallel to the longitudinal axis of the aircraft; a transparent indicating face member mounted at the forward end of said housing member; an opaque circular partition mounted intermediate the ends of said housing member; an axial shaft pivotally mounted in said housing member and extending through said partition; a pendulous weight secured to said shaft behind said partition for pivotal movement in a transverse plane in response to acceleration forces; a pendulum indicator secured to said shaft between said face member and said partition to indicate such transverse acceleration forces; means in said housing member operative to dampen oscillations of said pendulous weight; an aircraft attitude indicator pivotally mounted on said housing member in front of said face member for oscillation in a transverse plane; means movable with said housing and operative to oscillate said attitude indicator to simulate banking of the aircraft; and a second attitude indicator secured to said housing and arranged adjacent said first attitude indicator and movable vertically relative thereto, to simulate pitching of the aircraft.

7. A flight indicating instrument for aircraft comprising, in combination, an indicator housing for mounting on an aircraft; a gyro-vertical universally mounted in said indicator housing; a cylindrical housing member movable with and stabilized by said gyro-vertical, the axis of said housing member being parallel to the longitudinal axis of the aircraft; a transparent indicating face member mounted at the forward end of said housing member; an opaque circular partition mounted intermediate the ends of said housing member; an axial shaft pivotally mounted in said housing member and extending through said partition; a pendulous weight secured to said shaft behind said partition for pivotal movement in a transverse plane in response to transverse acceleration forces; a pendulum indicator secured to said shaft between said face member and said partition to indicate such transverse acceleration forces; means in said housing member operative to dampen oscillation of said pendulous weight; an aircraft attitude indicator pivotally mounted on said housing member in front of said face member for oscillation in a transverse plane; means movable with said housing and operative to oscillate said attitude indicator to simulate banking of the aircraft; a second attitude indicator adjustably secured to said housing and arranged adjacent said first attitude indicator and movable vertically relative thereto to simulate pitching of the aircraft; and means for adjusting said second indicator to align said attitude indicators when the aircraft is in its normal fore and aft flight attitude.

THOMAS O. SUMMERS, Jr.

REFERENCES CITED

The following references are of record in the file of this patent:

UNITED STATES PATENTS

| Number | Name | Date |
|---|---|---|
| 1,433,102 | Sparry | Oct. 24, 1922 |
| 1,706,201 | Drexler | Mar. 19, 1929 |
| 1,732,397 | Braibant | Oct. 22, 1929 |
| 1,903,710 | Stohr | Apr. 11, 1933 |
| 2,141,555 | Reid | Dec. 27, 1938 |

FOREIGN PATENTS

| Number | Country | Date |
|---|---|---|
| 145,459 | British | Apr. 21, 1921 |
| 145,460 | British | Oct. 18, 1921 |
| 474,694 | German | Apr. 9, 1929 |